US012596549B2

(12) United States Patent
Mishra et al.

(10) Patent No.: US 12,596,549 B2
(45) Date of Patent: Apr. 7, 2026

(54) METHOD AND SYSTEM FOR ACCELERATION OF SLOWER DATA PROCESSING CODES IN MACHINE LEARNING PIPELINES

(71) Applicant: Tata Consultancy Services Limited, Mumbai (IN)

(72) Inventors: Mayank Mishra, Thane West (IN); Rekha Singhal, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 202 days.

(21) Appl. No.: 18/544,697

(22) Filed: Dec. 19, 2023

(65) Prior Publication Data

US 2024/0220245 A1    Jul. 4, 2024

(30) Foreign Application Priority Data

Dec. 28, 2022    (IN)  .............................. 202221076276

(51) Int. Cl.
  *G06F 8/40*        (2018.01)
  *G06F 9/30*        (2018.01)
  *G06F 9/38*        (2018.01)

(52) U.S. Cl.
  CPC ........ *G06F 9/30007* (2013.01); *G06F 9/3877* (2013.01)

(58) Field of Classification Search
  CPC ....................................................... G06F 8/40
  See application file for complete search history.

(56) References Cited

U.S. PATENT DOCUMENTS 7,418,431 B1 * 8/2008  Nies ...................... G06F 16/972
                                                707/E17.117
10,552,130 B1 * 2/2020  Tene ......................... G06F 8/75
(Continued)

FOREIGN PATENT DOCUMENTS

IN        202121058260        12/2022

OTHER PUBLICATIONS

Logaras et al., "Python to Accelerate Embedded SoC Design: A Case Study for Systems Biology," ACM Transactions on Embedded Computing Systems, 13(4) (2014).
(Continued)

*Primary Examiner* — Jae U Jeon
(74) *Attorney, Agent, or Firm* — Finnegan, Henderson, Farabow, Garrett & Dunner, LLP

(57) ABSTRACT

Data processing code in machine learning pipelines is primarily done using data frame APIs provided by Pandas and similar libraries. Though, these libraries are easy to use, their temporal performance is worse than similar code written using NumPy or other high-performance libraries. Embodiments herein provide a system and method for acceleration of slower data processing code in machine learning pipelines by automatically generating an accelerated data processing code. Initially, a code is received and pre-processed based on a predefined format to get a standardized code. Further, system identifies code statements having operations that to be performed on a data frame, and an ordered list of data frame columns to generate a filtered dictionary code. Further, a data processing representation is generated using filtering dictionary code and ordered list of data frame columns. Finally, an accelerated data processing code is recommended based on the data processing representation.

8 Claims, 5 Drawing Sheets

200

Receiving, via an input/output interface, an unaccelerated data processing code from a user — 202

Pre-processing unaccelerated data processing code based on a predefined format to get a standardized code — 204

Identifying statements of the standardized code having one operation is to be performed on a data frame — 206

Identifying an ordered list of one or more data frame columns — 208

Determining a filtering dictionary code from the identified ordered list of one or more data frame columns — 210

Generating a data processing representation using the determined filtering dictionary code — 212

Recommending an accelerated performant code from the data processing representation of the standardized code — 214

(56) References Cited

U.S. PATENT DOCUMENTS

| | | | | |
|---|---|---|---|---|
| 2005/0055677 | A1* | 3/2005 | Nanja | .................. G06F 8/4434 |
| | | | | 717/136 |
| 2005/0262491 | A1* | 11/2005 | Gu | ....................... G06F 8/4443 |
| | | | | 717/151 |
| 2014/0258997 | A1* | 9/2014 | Lim | ....................... G06F 8/443 |
| | | | | 717/151 |

OTHER PUBLICATIONS

Spiegelberg et al., "Tuplex: Data Science in Python at Native Code Speed," Research Data Management Track Paper (2021).
Yang et al., "PyISOLVER—A Fast Python OOP Implementation of LRDFIT Model," IEEE (2019).

* cited by examiner

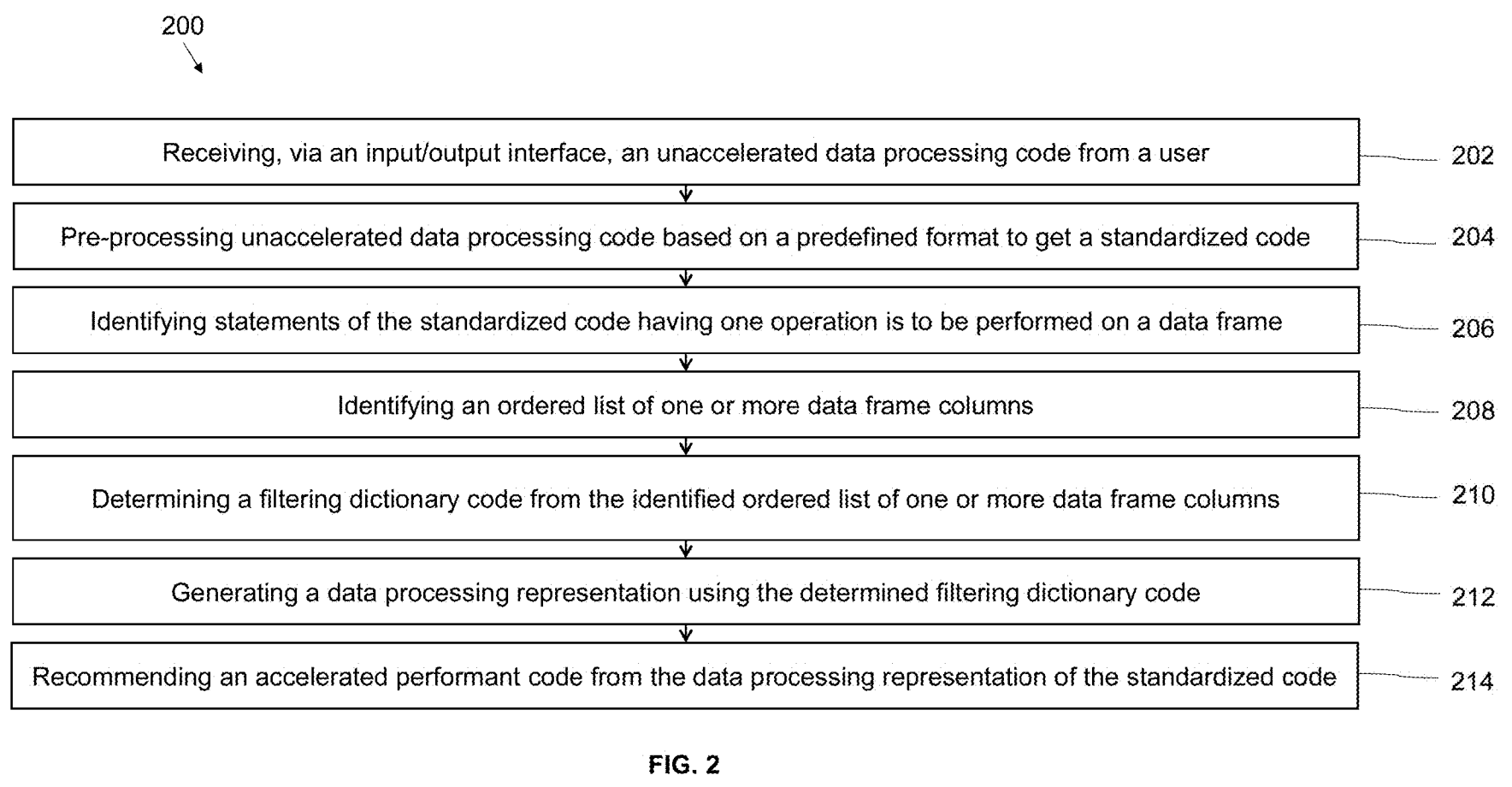

200

202 — Receiving, via an input/output interface, an unaccelerated data processing code from a user 204 — Pre-processing unaccelerated data processing code based on a predefined format to get a standardized code 206 — Identifying statements of the standardized code having one operation is to be performed on a data frame 208 — Identifying an ordered list of one or more data frame columns 210 — Determining a filtering dictionary code from the identified ordered list of one or more data frame columns 212 — Generating a data processing representation using the determined filtering dictionary code 214 — Recommending an accelerated performant code from the data processing representation of the standardized code

FIG. 2

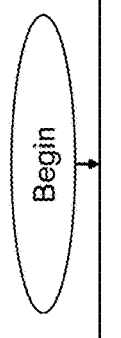

400

Begin

Initialization:
- Let $DPR$ represent the intermediate representation of code $C$. $DPR_j$ represents the entry $j$ of the $DPR$. $j = 1$
- Let $DFC$ represents list of data frame columns being used (From Flowchart 2). The columns in this list are in order they appeared in slow code. The columns are denoted as $column1, column2, ..., columnK$
- Let $DF$ represents the main data frame (from Flowchart 2).
- Let $AD$ denote the code generated. $AD_i$ refers to the statement $i$ of the generated code. $i = 1$ Create a dictionary using columns of $DF$ listed in $DFC$.
The key is the first column. Let us denote this column as $DF[column1]$
$$AD_1 = \text{"keys} = DF[column1]\text{"}$$

The value is the list of tuples corresponding to the key.
$$AD_2 = \text{"values} = tuple(zip(DF[column1], DF[column2], ..., DF[columnK]))\text{"}$$

Create a list of keys and values
$$AD_3 = \text{"lst=list(zip(keys,values)) d=defaultdict(list)"}$$

Define a dictionary of type default dict.
$$AD_4 = \text{"d=defaultdict(list)"}$$
$$AD_5 = \text{"for x,y in lst:"}$$
$$AD_6 = \text{"} \quad d[x].append(y)\text{"}$$

End

FIG. 4

METHOD AND SYSTEM FOR ACCELERATION OF SLOWER DATA PROCESSING CODES IN MACHINE LEARNING PIPELINES

CROSS-REFERENCE TO RELATED APPLICATIONS AND PRIORITY

This U.S. patent application claims priority under 35 U.S.C. § 119 to Indian Application number 202221076276, filed on Dec. 28, 2022. The entire content of the abovementioned application is incorporated herein by reference.

TECHNICAL FIELD

The disclosure herein generally relates to the field of data processing code performance and more particularly, to a system and method for acceleration of slower data processing code in machine learning pipelines by automatically generating an accelerated data processing code.

BACKGROUND

Machine Learning (ML) is a data-driven approach and is widely used to automate applications. Data pre-processing is a key step in data-driven approaches especially in the machine learning (ML) pipeline. The data pre-processing includes data cleaning, data transformation, data joins, data visualization for feature identification, and finally, building features for model training.

Generally, data processing code in the ML pipelines is primarily performed using data frames application programming interface (API) provided by Pandas and similar libraries. Even though these libraries are easy to use, their temporal performance (time taken to execute certain operations) is worse than similar code written using NumPy or other high-performance libraries.

SUMMARY

Embodiments of the disclosure present technological improvements as solutions to one or more of the above-mentioned technical problems recognized by the inventors in conventional systems. For example, in one embodiment, a method and system for acceleration of slower data processing code in machine learning pipelines by automatically generating an accelerated data processing code is provided. It would be appreciated that slow data processing code, slower data processing code, and unaccelerated data processing code hereinafter are being used interchangeably.

In one aspect, a processor-implemented method for acceleration of slower data processing code in machine learning pipelines by automatically generating an accelerated data processing code. The processor-implemented method comprising receiving, via an input/output interface, an unaccelerated data processing code from a user and pre-processing, via one or more hardware processors, the received unaccelerated data processing code based on a predefined format to get a standardized code. Further, the processor-implemented method includes identifying, via the one or more hardware processors, at least one statement of the one or more statements of the standardized code having one operation is to be performed on a data frame. Furthermore, the processor-implemented method includes identifying, via the one or more hardware processors, an ordered list of one or more data frame columns. Furthermore, the processor-implemented method includes determining, via the one or more hardware processors, a filtering dictionary code from the identified ordered list of one or more data frame columns. Furthermore, the processor-implemented method includes generating, via the one or more hardware processors, a data processing representation using the determined filtering dictionary code, the ordered list of one or more data frame columns. Finally, the method includes recommending, via the one or more hardware processors, an accelerated performant code from the data processing representation of the standardized standard code.

In another aspect, a system for acceleration of slower data processing code in machine learning pipelines by automatically generating an accelerated data processing code is provided. The system includes at least one memory storing programmed instructions, one or more Input/Output (I/O) interfaces, and one or more hardware processors operatively coupled to the at least one memory, wherein the one or more hardware processors are configured by the programmed instructions to receive an unaccelerated data processing code from a user, wherein the unaccelerated data processing code comprising one or more statement of operations. Further, the one or more hardware processors are configured by the programmed instructions to pre-process the received unaccelerated data processing code based on a predefined format to get a standardized code and identify at least one statement of the one or more statements of the standardized code having one operation is to be performed on a data frame. Furthermore, the one or more hardware processors are configured by the programmed instructions to identify an ordered list of one or more data frame columns and determine a filtering dictionary code from the identified ordered list of one or more data frame columns. Furthermore, the one or more hardware processors are configured by the programmed instructions to generate a data processing representation using the determined filtering dictionary code, the ordered list of one or more data frame columns. Finally, the one or more hardware processors are configured by the programmed instructions to recommend an accelerated performant code from the data processing representation of the standardized standard code.

In yet another aspect, one or more non-transitory machine-readable information storage mediums are provided comprising one or more instructions, which when executed by one or more hardware processors causes a method for acceleration of slower data processing code in machine learning pipelines by automatically generating an accelerated data processing code. The processor-implemented method comprising receiving, via an input/output interface, an unaccelerated data processing code from a user and pre-processing, via one or more hardware processors, the received unaccelerated data processing code based on a predefined format to get a standardized code. Further, the processor-implemented method includes identifying, via the one or more hardware processors, at least one statement of the one or more statements of the standardized code having one operation is to be performed on a data frame. Furthermore, the processor-implemented method includes identifying, via the one or more hardware processors, an ordered list of one or more data frame columns. Furthermore, the processor-implemented method includes determining, via the one or more hardware processors, a filtering dictionary code from the identified ordered list of one or more data frame columns. Furthermore, the processor-implemented method includes generating, via the one or more hardware processors, a data processing representation using the determined filtering dictionary code, the ordered list of one or more data frame columns. Finally, the method includes recommending, via the one or more hardware processors, an accelerated performant code from the data processing representation of the standardized standard code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is an exemplary flow diagram illustrating a method for acceleration of slower data processing code in machine learning pipelines, in accordance with some embodiments of the present disclosure.

FIG. 4 is a flowchart to illustrate process to generate a filtering dictionary code from data frame column ordered list, in accordance with some embodiments of the present disclosure.

DETAILED DESCRIPTION

Figure 1:
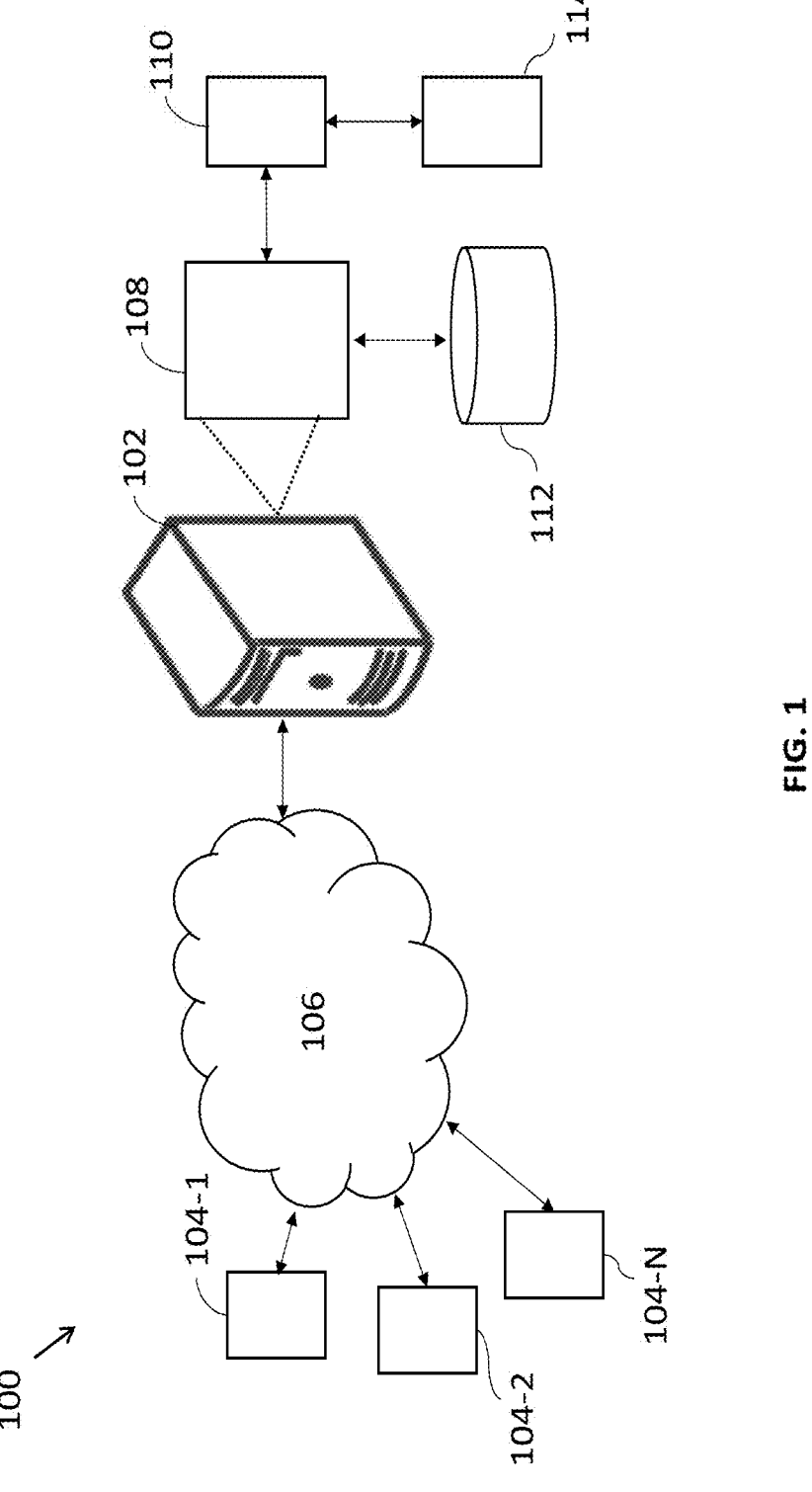
FIG. 1 illustrates a network diagram of a system for acceleration of slower data processing code in machine learning pipelines, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Data processing code in machine learning pipelines is primarily done using data frames Application Program Interface (API) provided by Pandas and similar libraries. Though, these libraries are easy to use, their temporal performance (time taken to execute certain operations) is worse than similar code written using NumPy or other high-performance libraries. Slow codes written using panda's library can be in form of individual statements or repeated set of statement applied as "function" or routine that can be applied repeatedly or invoked as a lambda function facility of Python. The values of arguments can be repeated multiple times depending on size of dataset. Therefore, same computation lines are repeated, making the data processing slower. However, an accelerated data processing code performs same operation written using Python lists, NumPy arrays, and dictionary. Herein, while making the dictionary, the computation once done is cached and reused thus speeding up the processing.

Therefore, embodiments herein provide a system and method for acceleration of slower data processing code in machine learning pipelines by automatically generating an accelerated data processing code. Initially, receiving, via an input/output interface, an unaccelerated data processing code from a user. The unaccelerated data processing code comprising one or more statement of operations. Further, the received unaccelerated data processing code are pre-processed based on a predefined format to get a standardized data processing code. Furthermore, at least one statement having an operation that to be performed on a data frame is identified from the one or more statement of operations. Herein, the at least one statement of operation comprising an operator, and one or more operands. In the next step, an ordered list of one or more data frame columns are identified and a filtered dictionary code is generated from the identified ordered list of one or more data frame columns. Further, a data processing representation is generated using the determined filtering dictionary code, the ordered list of one or more data frame columns. Finally, an accelerated data processing code is recommended based on the generated data processing representation.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a network diagram of a system 100 for acceleration of slower data processing code in machine learning pipelines by automatically generating an accelerated data processing code. Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The data repository 112 may also be referred as a dynamic knowledge base 112 or a knowledge base 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of modules. The plurality of modules is configured to perform various functions.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an exemplary flow diagrams illustrating a processor-implemented method 200 for acceleration of slower data processing code in machine learning pipelines by automatically generating an accelerated data processing code implemented by the system of FIG. 1, according to some embodiments of the present disclosure.

Initially at step 202 of the method 200, an unaccelerated data processing code is received, via an input/output interface 104, from a user to recommend an accelerated performant code. The unaccelerated data processing code comprises one or more statement of operations.

At the next step 204 of the method 200, the one or more hardware processors 102 are configured by the programmed instructions to pre-process the received unaccelerated data processing code based on a predefined format to get a standardized code. There should not be more than one operation in the code statement. Thus, the code is processed to detect present of more than one operation, and if more than one operation is detected then the code statement is broken into multiple code statements.

At the next step 206 of the method 200, the one or more hardware processors 102 are configured by the programmed instructions to identify at least one statement of the one or more statements of the standardized code. Each standardized code having at least one operation to perform on a data frame. Wherein the operation comprising an operator, and one or more operands.

At the next step 208 of the method 200, the one or more hardware processors 102 are configured by the programmed instructions to generate a data processing representation (DPR), and the ordered list of one or more data frame columns. The data processing representation (DPR) of the code is represented as a list of entries. Each entry in the data processing representation holds information for a particular code statement. The code statement includes code with operations performed on a data frame, which needs to be accelerated. If the code statement does not contain operation over data frame, then it is ignored.

Figure 3:
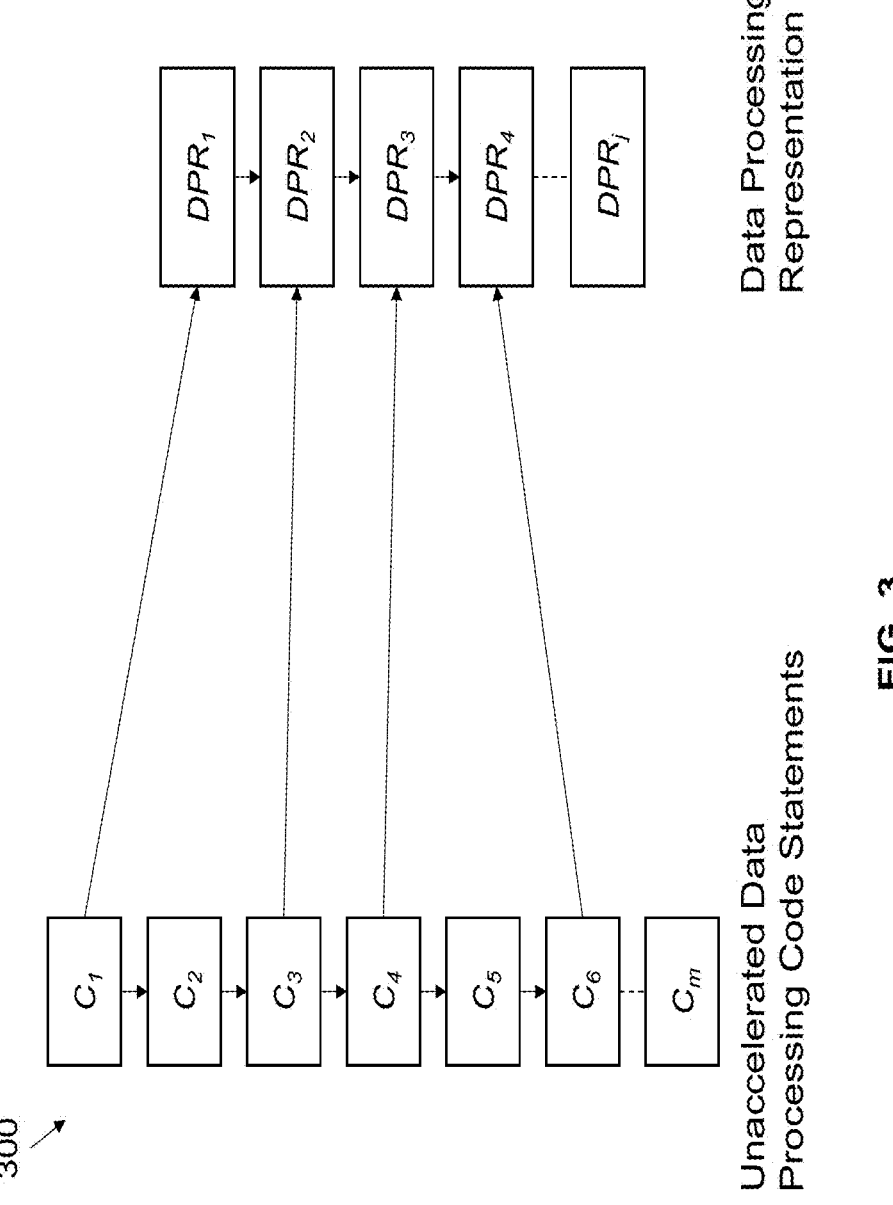
FIG. 3 illustrates a block diagram to illustrate a data processing representation, in accordance with some embodiments of the present disclosure.

A data processing representation of an example code C, which needs to be accelerated, is represented as a list of entries, as depicted in FIG. 3. Each entry $DPR_j$, where $DPR_j$ holds information for a particular code statement $C_i$, where $C_i$ contains code with operation performed on a data frame, which needs to be accelerated. If a code statement $C_i$ does not contain operation over data frame then it is ignored ($C_2$, $C_5$ in FIG. 3). Every entry $DPR_j$ of DPR consists of following:

$Codeline_{id}$ denoting the correspondence to $C_i$. It is set to i if $C_i$ is identified as non-performant code statement.

$DF_{input}$ which denotes the data frames being operated upon or manipulated.

$D_{output}$ which denotes the resultant data object.

O denotes operation performed. The operation O consists of following:
  i. Operator p
  ii. First operand $r_1$ on which operator ρ is applied, and type of operand $r_1$ denoted by $r_1$.type
  iii. Second operand $r_2$ on which operator ρ is applied, and type of operand $r_2$ denoted by $r_2$.type At the next step 210 of the method 200, the one or more hardware processors 102 are configured by the programmed instructions to identify an ordered list of one or more data frame columns. The data frame columns present in the slow code are identified by parsing the data objects present in the unaccelerated code line by line and checking the nature of parsed objects. The data objects which are of type data frame columns are added in a list named Data frame Column (DFC) ordered list.

For example, if there are 2 data frame columns being referred in the unaccelerated code then the first element in the list captures the details of first data frame column which appeared in the unaccelerated code. The second element in the list captures the details of second data frame column which appeared in the unaccelerated code.

At the next step 212 of the method 200, the one or more hardware processors 102 are configured by the programmed instructions to determine a code of filtering dictionary from the identified ordered list of one or more data frame columns. The DFC ordered list is used to create code of filtering dictionary. The code of filtering dictionary is in the form of the key value pairs. The first entry in the DFC is the first data frame column which appears in the unaccelerated code as shown in FIG. 4. The set of unique "data values" present in the first data frame column, say "fcol", are used as keys in the filtering dictionary. For each "key", say "K", in the filtering dictionary the corresponding content of the "value" is the set of rows of the data frame where the column "fcol" has data value equal to the "K".

The code to create the filtering dictionary is template based where the system 100 passes the DFC and the template of filtering dictionary decides the keys and values to be put in dictionary. The data values of first column "fcol" appearing in DFC are used as keys. For each key "K" in the dictionary the value is the set of rows of the data frame where the column "fcol" has data value equal to the "K".

Referring back to FIG. 2, at the last step 214 of the method 200, the one or more hardware processors 102 are configured by the programmed instructions to recommend accelerated performant code from the data processing representation of the standardized unaccelerated code.

Figure 5:
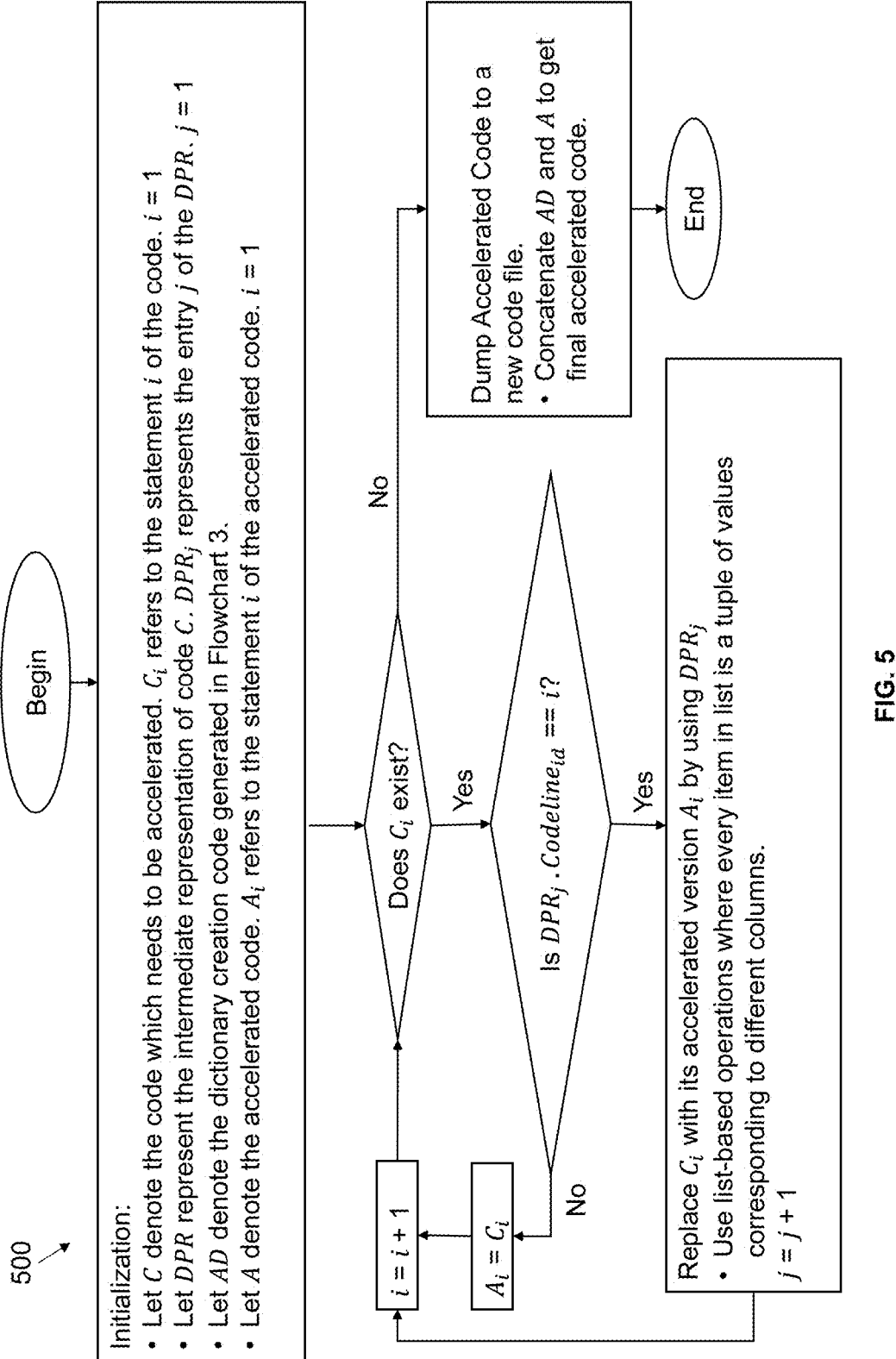
FIG. 5 is a flowchart to illustrate process to generate a performant code from the data processing representation, in accordance with some embodiments of the present disclosure.

Referring FIG. 5, illustrating a flowchart 500 for generating an accelerated performant code from the DPR, according to some embodiments of the present disclosure. The generated code of filtering dictionary becomes the part of the accelerated performant code. The statements of the unaccelerated code are visited in order and their corresponding entry in the DPR are accessed. If any statement in the unaccelerated code does not have a corresponding DPR entry, then it is put as it is in the accelerated code. In case there is DPR entry for a code statement, then, the information presented in corresponding DPR node (containing operation, operands, Input data frame, output data object) is converted to code by using list and NumPy based operations. The converted code is then made part of accelerated code.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of temporal performance of data processing code in machine learning (ML) pipelines using data frames API provided by pandas and similar libraries. Embodiments herein provide a system and method for acceleration of slower data processing code in machine learning pipelines by automatically generating an accelerated data processing code. Initially, receiving, via an input/output interface, an unaccelerated data processing code from a user, wherein the unaccelerated data processing code comprising one or more statement of operations. Further, the received unaccelerated data processing code are pre-processed based on a pre-defined format to get a standardized data processing code. Furthermore, at least one statement having an operation that to be performed on a data frame is identified from the one or more statement of operations. Herein, the at least one statement of operation comprising an operator, and one or more operands. In the next step, an ordered list of one or more data frame columns are identified and a filtered dictionary code is generated from the identified ordered list of one or more data frame columns. Further, a data processing representation is generated using the determined filtering dictionary code, the ordered list of one or more data frame columns. Finally, an accelerated data processing code is recommended based on the generated data processing representation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
   receiving, via an input/output interface, an unaccelerated data processing code comprising one or more statement of operations;
   pre-processing, via the one or more hardware processors, the received unaccelerated data processing code based on a predefined format to get a standardized code, wherein the standardized code comprising one operation to perform on a data frame;
   identifying, via the one or more hardware processors, at least one statement of the one or more statements of the standardized code having at least one operation that to be performed on the data frame, wherein the unaccelerated data processing code is processed to detect presence of the at least one operation, and if more than one operation is detected then the statement of the unaccelerated data processing code is broken into multiple statements of code to get the standardized code;

generating, via the one or more hardware processors, a data processing representation and an ordered list of one or more data frame columns, using the standardized code, wherein each entry in the data processing representation holds information for a code statement and the code statement includes code with operations performed on a data frame, which needs to be accelerated, and wherein when the operations over data frame are absent in the code statement, then the code statement is ignored;

identifying, via the one or more hardware processors, an ordered list of one or more data frame columns using the generated data processing representation in the standardized code, wherein each of the one or more data objects present in the unaccelerated data processing code is identified by parsing the one or more data objects present in the unaccelerated data processing code line by line and checking the parsed objects and the data objects, which are of type data frame columns, are added in the ordered list;

determining, via the one or more hardware processors, a filtering dictionary code from the identified ordered list of one or more data frame columns; and recommending, via the one or more hardware processors, an accelerated performant code from the data processing representation of the standardized code and the determined filtering dictionary code, wherein statements of the unaccelerated data processing code are visited in order and corresponding entry in the data processing representation are accessed and when statement in the unaccelerated data processing code does not have a corresponding data processing representation entry, the corresponding statement is put as it is in the accelerated code and when statement in the unaccelerated data processing code has a corresponding data processing representation entry, the information presented in corresponding data processing representation node is converted to a code by using list and NumPy based operation and the converted code is made part of the accelerated code, wherein the data processing representation node contains operation, operands, input data frame, and output data object.

2. The processor-implemented method of claim 1, wherein the operation comprising an operator, and one or more operands.

3. The processor-implemented method of claim 1, wherein a template of filtering dictionary decides keys as the values of a first column appearing in the data frame column and value as the set of rows of the data frame where the column denoted by the first entry of the data frame column has value equal to the key to dictionary.

4. A system comprising: an input/output interface to receive an unaccelerated data processing code comprising one or more statement of operations;

a memory in communication with the one or more hardware processors, wherein the one or more hardware processors are configured to execute programmed instructions stored in the memory to:

pre-process the received unaccelerated data processing code based on a predefined format to get a standardized code;

identify at least one statement of the one or more statements of the standardized code having at least one operation is to be performed on a data frame, wherein the operation comprising an operator, and one or more operands, wherein the unaccelerated data processing code is processed to detect presence of the at least one operation, and if more than one operation is detected then the statement of the unaccelerated data processing code is broken into multiple statements of code to get the standardized code;

generate a data processing representation and an ordered list of one or more data frame columns, using the standardized code, wherein each entry in the data processing representation holds information for a code statement and the code statement includes code with operations performed on a data frame, which needs to be accelerated, and wherein when the operations over data frame are absent in the code statement, then the code statement is ignored;

identify an ordered list of one or more data frame columns using the generated data processing representation in the standardized code, wherein each of the one or more data objects present in the unaccelerated data processing code is identified by parsing the one or more data objects present in the unaccelerated data processing code line by line and checking the parsed objects and the data objects which are of type data frame columns are added in the ordered list;

determine a filtering dictionary code from the identified ordered list of one or more data frame columns; and recommend an accelerated performant code from the data processing representation of the standardized code and the determined filtering dictionary code, wherein statements of the unaccelerated data processing code are visited in order and corresponding entry in the data processing representation are accessed and when statement in the unaccelerated data processing code does not have a corresponding data processing representation entry, the corresponding statement is put as it is in the accelerated code and when statement in the unaccelerated data processing code has a corresponding data processing representation entry, the information presented in corresponding data processing representation node is converted to a code by using list and NumPy based operation and the converted code is made part of the accelerated code, wherein the data processing representation node contains operation, operands, input data frame, and output data object.

5. The system of claim 4, wherein a template of filtering dictionary decides the keys as the values of first column appearing in the data frame column and value as the set of rows of the data frame where the column denoted by the first entry of the data frame column has value equal to the key to dictionary.

6. One or more non-transitory machine-readable information storage mediums comprising one or more instructions which when executed by one or more hardware processors cause:

receiving, via an input/output interface, an unaccelerated data processing code comprising one or more statement of operations;

pre-processing the received unaccelerated data processing code based on a predefined format to get a standardized code, wherein the standardized code comprising one operation to perform on a data frame;

identifying at least one statement of the one or more statements of the standardized code having at least one operation that to be performed on the data frame, wherein the unaccelerated data processing code is processed to detect presence of the at least one operation, and if more than one operation is detected then the statement of the unaccelerated data processing code is broken into multiple statements of code to get the standardized code;

generating a data processing representation and an ordered list of one or more data frame columns, using the standardized code, wherein each entry in the data processing representation holds information for a code statement and the code statement includes code with operations performed on a data frame, which needs to be accelerated, and wherein when the operations over data frame are absent in the code statement, then the code statement is ignored;

identifying an ordered list of one or more data frame columns using the generated data processing representation in the standardized code, wherein each of the one or more data objects present in the unaccelerated data processing code is identified by parsing the one or more data objects present in the unaccelerated data processing code line by line and checking the parsed objects and the data objects which are of type data frame columns are added in the ordered list determining, a filtering dictionary code from the identified ordered list of one or more data frame columns; and recommending, an accelerated performant code from the data processing representation of the standardized code and the determined filtering dictionary code, wherein statements of the unaccelerated data processing code are visited in order and corresponding entry in the data processing representation are accessed and when statement in the unaccelerated data processing code does not have a corresponding data processing representation entry, the corresponding statement is put as it is in the accelerated code and when statement in the unaccelerated data processing code has a corresponding data processing representation entry, the information presented in corresponding data processing representation node is converted to a code by using list and NumPy based operation and the converted code is made part of the accelerated code, wherein the data processing representation node contains operation, operands, input data frame, and output data object.

7. The one or more non-transitory machine-readable information storage mediums of claim 6, wherein the operation comprising an operator, and one or more operands.

8. The one or more non-transitory machine-readable information storage mediums of claim 6, wherein a template of filtering dictionary decides keys as the values of a first column appearing in the data frame column and value as the set of rows of the data frame where the column denoted by the first entry of the data frame column has value equal to the key to dictionary.

* * * * *